United States Patent
Holmes et al.

(10) Patent No.: US 8,027,993 B2
(45) Date of Patent: Sep. 27, 2011

(54) TECHNIQUES FOR ESTABLISHING AND ENFORCING ROW LEVEL DATABASE SECURITY

(75) Inventors: David Holmes, Bethesda, MD (US); Gary Christoph, Columbia, MD (US)

(73) Assignee: Teradota US, Inc., Dayton, OH (US)

( * ) Notice: Subject to any disclaimer, the term of this patent is extended or adjusted under 35 U.S.C. 154(b) by 634 days.

(21) Appl. No.: 11/646,654

(22) Filed: Dec. 28, 2006

(65) Prior Publication Data

US 2008/0162402 A1 Jul. 3, 2008

(51) Int. Cl.
*G06F 17/30* (2006.01)
(52) U.S. Cl. .............................. 707/783; 726/27; 726/30
(58) Field of Classification Search .................. 707/2, 9, 707/8, 783, 785, 999.002, 999.008, 999.009; 726/27, 30
See application file for complete search history.

(56) References Cited

U.S. PATENT DOCUMENTS

| | | | |
|---|---|---|---|
| 5,832,484 A * | 11/1998 | Sankaran et al. ................. 707/8 |
| 6,336,121 B1 * | 1/2002 | Lyson et al. .................. 707/201 |
| 6,704,868 B1 * | 3/2004 | Challener et al. ............. 713/168 |
| 6,741,991 B2 * | 5/2004 | Saito ................................. 707/9 |
| 7,661,141 B2 * | 2/2010 | Dutta et al. ...................... 726/26 |
| 2001/0002485 A1 * | 5/2001 | Bisbee et al. ................. 713/167 |
| 2003/0014394 A1 * | 1/2003 | Fujiwara et al. .................. 707/3 |
| 2004/0044655 A1 | 3/2004 | Cotner et al. |
| 2004/0250098 A1 | 12/2004 | Licis |
| 2005/0086252 A1 * | 4/2005 | Jones et al. ................... 707/102 |
| 2005/0177570 A1 | 8/2005 | Dutta et al. |
| 2005/0262087 A1 | 11/2005 | Wu et al. |
| 2006/0053112 A1 * | 3/2006 | Chitkara et al. .................. 707/9 |
| 2006/0136361 A1 | 6/2006 | Peri et al. |
| 2006/0195449 A1 * | 8/2006 | Hunter et al. ...................... 707/9 |
| 2006/0200860 A1 | 9/2006 | Taylor et al. |
| 2006/0206485 A1 * | 9/2006 | Rubin et al. ...................... 707/9 |

* cited by examiner

*Primary Examiner* — James Trujillo
*Assistant Examiner* — Jorge A Casanova
(74) *Attorney, Agent, or Firm* — Schwegman, Lundberg & Woessner

(57) ABSTRACT

Techniques for establishing and enforcing row level database security are presented. Qualifiers are used to uniquely identify particular rows of a database table. The qualifiers are selectively combined to generate a hash value. The hash value is associated with a user. The user is permitted to accesses selective rows of the database table in response to the rows represented in the hash value, which is associated with the user.

11 Claims, 3 Drawing Sheets

TECHNIQUES FOR ESTABLISHING AND ENFORCING ROW LEVEL DATABASE SECURITY

FIELD

The invention relates generally to database technology and more particularly to techniques for establishing and enforcing row level database security.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals: such as planning, analytics, reporting, etc.

Some information included in the database is confidential, such that an enterprise or an individual may desire to maintain security with respect to accessing and modifying certain information included within the database. Often entire database tables have access to their information restricted based on identifiers of certain users or based on certain roles that users assume when they are authenticated to the database.

Generally, access to resources of a database is restricted at a user-level of granularity. So, if a table of information is accessible to a user, then that entire table is usually accessible to the user. Likewise, if a table is not accessible to a user, then the entire table is probably not accessible to the user. In fact, there is little ability to restrict access to sub portions of a database table. Moreover, even when access is arguably capable of being restricted to sub portions of the table, the table itself often carries security identifiers to enforce security at a sub portion level of granularity. The problem with this approach is that the table can become untoward when access security is carried within the table. This is especially so when updates and/or changes are frequently made to the table, or when the information carried with and security associated with the table is voluminous.

In still other approaches, specific enterprise applications may be developed to sit on top of or monitor the database. These applications may provide security at a sub table portion level of granularity within the database, but they are application specific or application centric. That is, they are not database centric meaning they are not geared to be managed and handled from the point of view a specific piece of data included within the database. These techniques alter interfaces associated with accessing the database to include limitations to enforce more granular security. However, if a user can view and edit the modified interfaces, such as modified SQL statements, then the security can be potentially circumvented and compromised.

Thus, it can be seen that improved and more efficient mechanisms for granular database security are needed.

SUMMARY

In various embodiments, techniques for establishing and enforcing row level database security are presented. According to an embodiment, a method for establishing row level database security is provided. A column is identified from a table of a database; the column includes a unique qualifier for a number of rows of the table. A hash value is generated for a selective combination of the qualifiers. The hash value is associated with a user. The hash value provides the user with access permission to selective rows of the table, which are represented in the hash value via the selective combination of the qualifiers.

DETAILED DESCRIPTION

Figure 1:
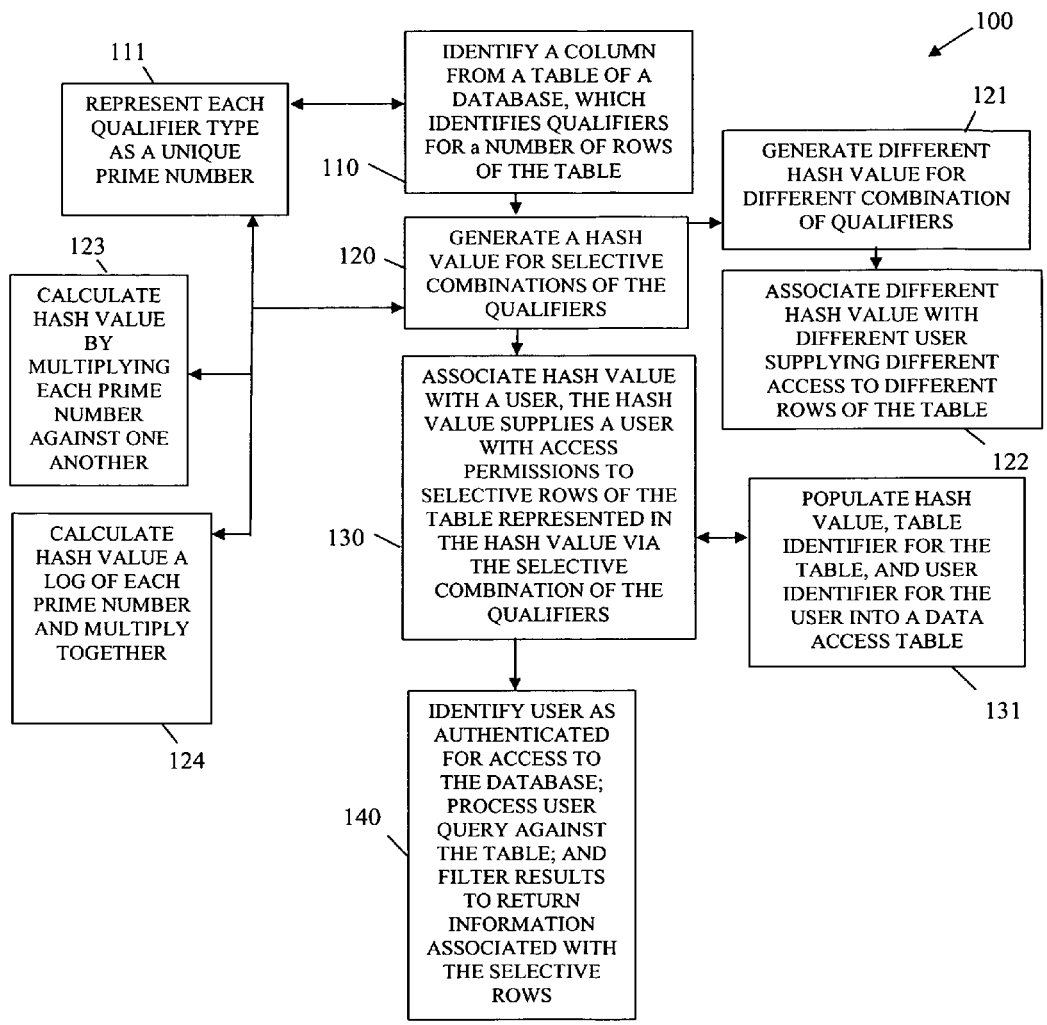
FIG. 1 is a diagram of a method for establishing row level database security, according to an example embodiment.

FIG. 1 is a diagram of a method 100 for establishing row level database security, according to an example embodiment. The method 100 (hereinafter "security establishment service") is implemented in a machine-accessible or computer-readable medium as instructions that when executed by a machine (processing device) performs the processing depicted in FIG. 1. Moreover, the security establishment service is optionally accessible over a network. The network may be wired, wireless, or a combination of wired and wireless.

A "database" as used herein is a relational database, or a collection of databases organized as a data warehouse. According to an embodiment, the database is a Teradata® product or service distributed by NCR Corporation of Dayton, Ohio.

The database includes a variety of enterprise information organized in tables. A table includes a variety of rows and columns. Each row includes a variety of fields. The fields, rows, and columns are defined via a table definition or schema.

As used herein a "hash value" or key may be used interchangeably. The hash value or key is unique for a particular combination of rows for a particular table. A single hash value or key may be associated with multiple different users.

A "qualifier" is natural data appearing in a table for which row level security is to be enforced. A particular qualifier is associated with a specific row or set of rows for a table. For instance, a claim type field of a health care database table record may include a variety of data values identifying specific heath care claim types; a particular claim type of say value "1" for cancer claims may be viewed as a qualifier. The database table may include several rows or records having a qualifier of "1;" but each row with the qualifier of "1" is uniquely distinguishable from other types of rows having other qualifiers because of the uniqueness of the claim type value. It is understood that any desired qualifier may be used. Any specific qualifier being used may be identified in Meta information or other independent and smaller tables used in connection with the table that is having row level access restricted.

It is within this context that the processing associated with the security establishment service is now described in detail with reference to the FIG. 1.

At 110, the security establishment service identifies a column of the database or a particular field. The column identifies qualifiers for a number of rows of a database table. Again, the specific qualifiers being used may be acquired from another separate table or from metadata. Each unique qualifier may be viewed as a different qualifier type. It is also understood that the table itself may include several rows having the same qualifier type.

According to an embodiment, at 111, each qualifier type may be associated with its own unique prime number; so, each qualifier type may be mapped to a particular unique prime number. Thus, just qualifiers of a same type are associated with a unique prime number. Each row of the table having a qualifier identified from the column is mapped to a particular prime number. Some rows may have the same prime numbers, when these rows are associated with the same qualifier type.

As an example, consider a healthcare table having a field or column associated with claim types. The claim types can assume values of 1, 2, and 3. A value of 1 indicates cancer, a value of 2 indicates diabetes, and a value of 3 indicates annual checkup. This table may just have 2 qualifier types for which row level security is to be enforced, namely, qualifiers having values "1" and "2." In this particular example, there may be no desire to enforce security on rows associated with annual checkups, value of "3." Assume further that there are 1000 rows or records in the table and 600 are of claim type 3; 200 are of claim type 1; and 200 are of claim type 2. Qualifier type 1 maps to a prime number of value 3 and qualifier type 2 maps to a prime number of value 5. 200 rows have a prime number association of 3 and 200 rows have a prime number association of 5. 600 rows have no particular prime number association or qualifier.

At 120, the security establishment service generates a hash value for selective combinations of the qualifiers. That is, selective rows for which row level security is to be assigned are represented by selective combinations of the qualifiers. In the previous example, there may be 3 potential selective combinations of the qualifiers. One combination may just include claim types of 1; one combination may just include claim types of 2; and one combination may include both claim types of 1 and 2. The desired combination selected may be configured or may be driven by an administrative interface.

According to an embodiment, at 121, the hash value may be generated as a novel product. The product is calculated by multiplying each unique prime number associated with each qualifier type together. So, if a selective combination in the continuing example includes qualifier types 1 and 2, where type 1 is associated with prime number 3 and type 2 is associated with prime number 5, then the product is 15 (3×5).

In yet another embodiment, at 122, the hash value may be generated as a log of a prime product. The log of each unique prime is taken and the log values multiplied together to obtain a product value. The product value represents the hash value. The log technique may be used in situations where the combinations of the selective rows include a large number of qualifier types and/or the unique prime numbers are themselves relatively large. The log technique reduces the likelihood that a product of the primes will exceed a database permissible value for an integer.

It is understood that other techniques may be used to generate a unique hash value that is unique within a particular table for particular combinations of rows. In a sense, the hash value may be viewed as a signature for combinations of rows within a particular database table. The signature or hash value provides access permissions at the row level of the table. As will be demonstrated more completely below, the user is associated with the signature or hash value and access to the table is filtered such that only the rows identified in the hash value or the signature are presented to or viewable by the user.

Similarly, at 121, the security establishment service may generate other or different hash values for different combinations of the rows within the table having different qualifier types. The different hash value, at 122, may be associated with or derived for a different user from what is discussed below with respect to the processing at 130. This provides different security levels to the same database table for different users at a row access level of granularity.

At 130, the security establishment service associates the hash value with a user. The hash value association supplies the user with access permissions at selective row security levels within the database table. The selective rows are identified in the hash value via the selective combinations of qualifiers, such as via product of primes, via product of the log of primes, etc.

In an embodiment, at 140, the security establishment service may identify a user as being authenticated for access to the database. Next, the security establishment service processes a query issued by the user for access to the table. Results of the query are filtered, such that information associated with just the rows for which the user has access permissions are presented to the user for viewing and manipulation. Essentially, the rows for which the user has no access and for which are not represented in the hash value are not presentable or cable of being presented to the user. In some cases, the query itself may be inspected and if a row for which the user has no access permission is used as a criterion within the query, the user is notified that the query is not permissible. Thus, the user may not use in any manner the information included in rows for which the user has no access permissions. Again, access permissions are carried via the user's association with the hash value or signature, which includes rows of the table for which the user does have access. As will be demonstrated in the discussions that follow, the users association with the hash value does not have to be carried in the table at all. In fact, the native table that the user attempts to access does not have to carry the hash value at all, as the hash value can be generated dynamically on demand with little overhead and the user association to the hash value resolved with other smaller tables.

Figure 2:
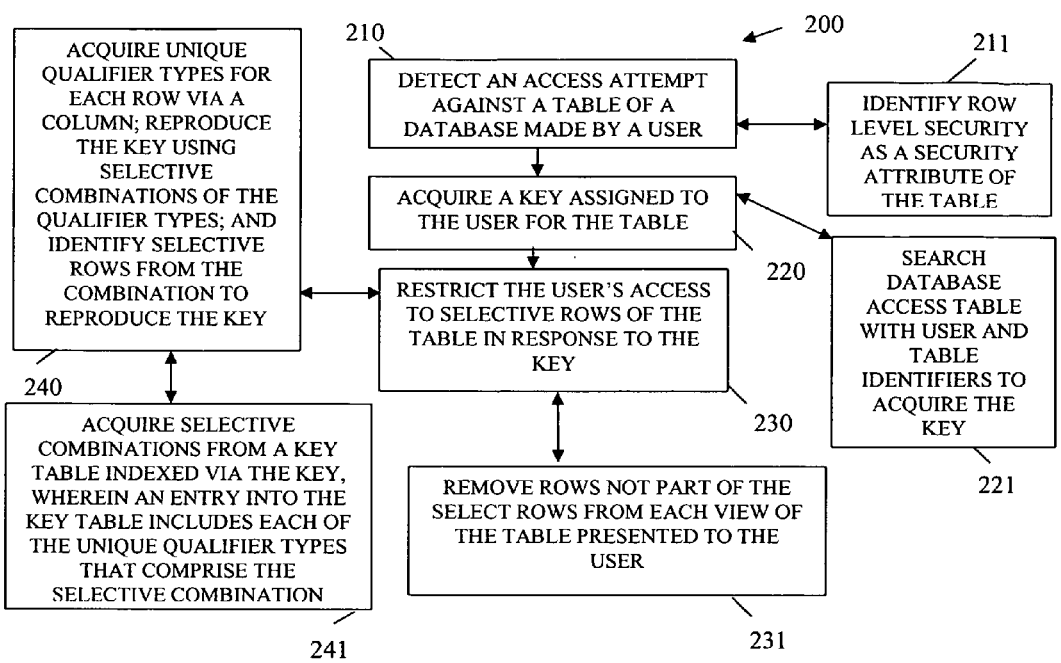
FIG. 2 is a diagram of another method for enforcing row level database security, according to an example embodiment.

FIG. 2 is a diagram of another method 200 for enforcing row level database security, according to an example embodiment. The method 200 (hereinafter "security enforcement service") is implemented in a machine-accessible and readable medium as instructions that when executed by a machine performs the processing reflected in FIG. 2. The security enforcement service may also be accessible over a network. The network may be wired, wireless, or a combination of wired and wireless. The security enforcement service presents another an enforcement perspective of the security establishment service represented by the method 100 of the FIG. 1.

At 210, the security enforcement service detects an access attempt made by a user against a database table for which row level security is associated or assigned. According to an embodiment, at 211, the security enforcement service may determine that row level security is to be enforced against the database table by inspecting a security attribute for the table that identifies row level security is being enforced. In fact, any policy or metadata may be used to signal that the table being accessed is associated with row level security enforcement to trigger the processing of the security enforcement service.

At 220, the security enforcement service acquires a key assigned to the user for the database table. In an embodiment, at 221, the security enforcement service may search a separate database access table with a table identifier for the table that the user is attempting to access and with a user identifier associated with the user. This information returns to the security enforcement service the key. The key defines the rows of the table for which the user is permitted to access and view. The key may be viewed as a signature because it actually represents specific rows within the table that the user is permitted to access. So, the key is more complex than a traditional access key as in this case the case can be used to resolve specific rows for which access is allowed. The term "key" may be used interchangeably with the terms "signature" and the phrase "hash value."

At 230, the security enforcement service restricts the user's access to selective rows of the database table in response to the key. At 310, the security enforcement service may remove rows that are not associated with the key from any view of the table presented to the user. In this manner, the user may just view and may just have access to views of the table that include rows represented in the key.

According to an embodiment, at 240, the security enforcement service may separately acquire unique qualifier types for a number of rows of the database table from a column or field of the table. The key is then reproduced using selective combinations of the unique qualifier types. The specific selective rows are then identified via the selective combinations of qualifier types used to reproduce the key. This may be done in a variety of manners.

For example, at 241, the security enforcement service may specifically identify the proper combinations for reproducing the key via a key table that is indexed on the key. Each indexed entry includes the qualifier types for that particular key and each qualifier type then corresponds to a particular row or set of rows within the database table. In this manner, the security enforcement service may reconstruct the key and specifically identify which rows the user is to have permissible access to. This is done without specifically including the key or the user identifier within the table itself. Moreover, the key can be used with other users and is not specifically tied to any given user within the key table. The key table includes the key value and qualifier types that comprise the key value. The key value may also include a specific table identifier, such that the key value may not be unique across different tables.

A variety of smaller tables having metadata permits the security enforcement service to acquire keys for a given user attempting to access a given table. These keys can then be decomposed to produce specific rows for which the users' keys corresponding within the table and the security enforcement service may then enforce row level security within the table on a key bases.

Figure 3:
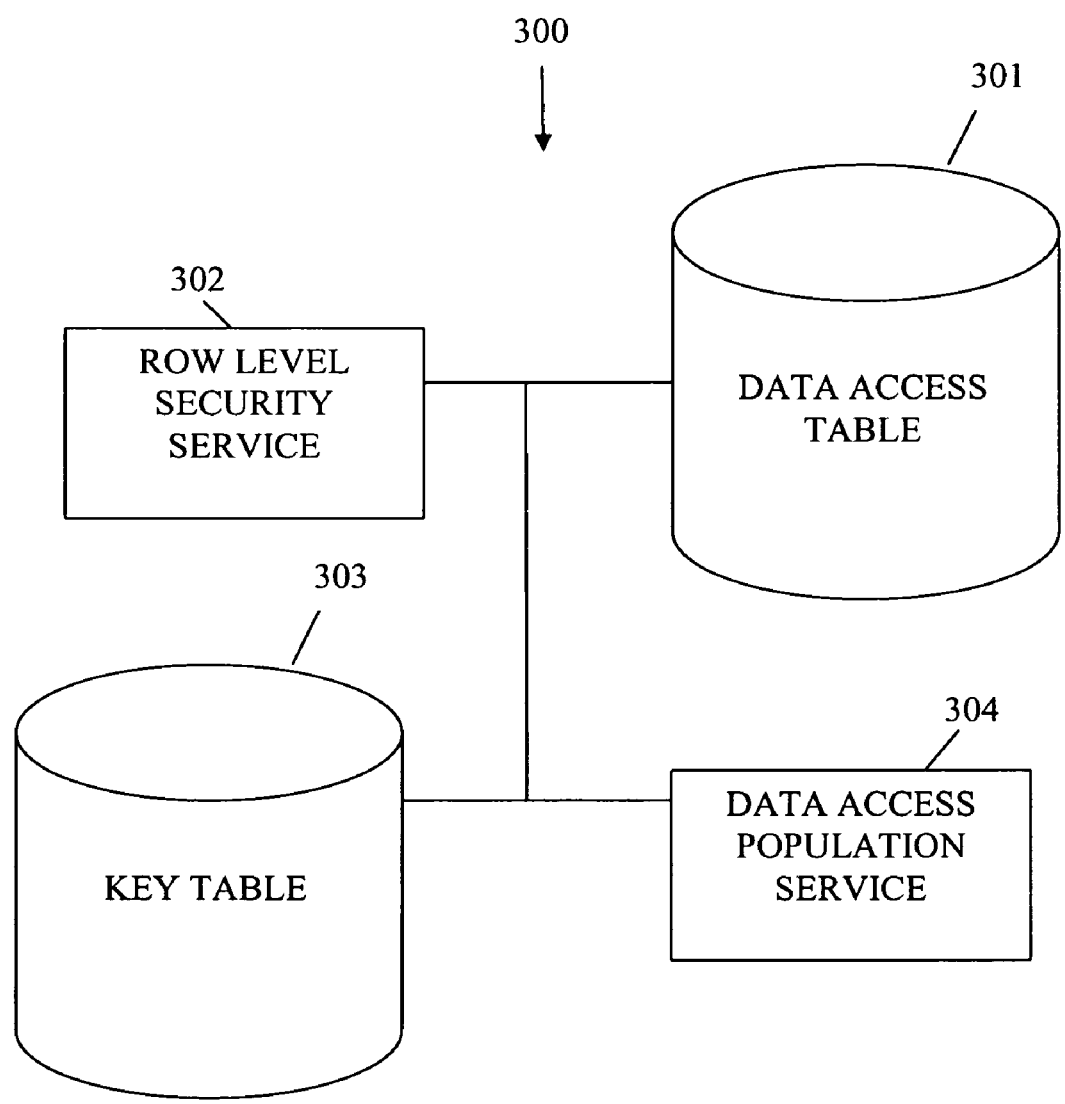
FIG. 3 is a diagram of a row level database security system, according to an example embodiment.

FIG. 3 is a diagram of a row level database security system 300, according to an example embodiment, according to an example embodiment. The row level database security system 300 is implemented in a machine-accessible and readable medium and is operational over a network. The network may be wired, wireless, or a combination of wired and wireless. In an embodiment, portions of the row level database security system 300 implements, among other things the security establishment service and the security enforcement service represented by the methods 100 and 200 of the FIGS. 1 and 2, respectively.

The row level database security system 300 includes a data access table 301 and a row level security service 302. The row level database security system 300 may also include a key table 303 and/or a data access population service 304. Each of these and their interactions with one another will now be discussed in turn.

The data access table 301 is implemented in a machine accessible medium within a database. The data access table 301 includes a plurality of entries. Each entry includes a user identifier and a key value. The data access table 301 is used by the row level security service 302 to acquire a particular key value for any given user and that user's attempt to access a particular table.

In some cases, the data access table 301 may be named or associated with a particular database table that the user may access within the database. In other cases, the data access table 301 may include an additional field representing a table identifier, the table identifier used to identify a particular database table that the user may access within the database. So, a single centralized version of the data access table 301 may exist or optionally a plurality of smaller data access tables 301 may exist; one for each user database table having row level security.

The row level security service 302 is also implemented in a machine accessible medium and is processed by a machine (processing device). During operation, the row level security service 302 intercepts or is called when a particular user attempts to access a database table. The database table includes a policy or an attribute indicating that row level security is being enforced on the table. The row level security service 302 submits a user identifier and optionally a table identifier to access the data access table 301 and to acquire a particular key value (signature value).

The particular key value may then be used by the row level security service 302 to access another table, such as a key table 303. The key table 303 is indexed based on key value and perhaps a table identifier (if a single centralized key table 303 is being used for each table having row level security). The entry that matches a particular key value and optionally a table identifier includes row qualifier types. Each row qualifier type maps to a particular row of the table. Thus, the entire key value may be reconstructed and reproduced and each row of the table that the user is permissibly able to access identified.

In some cases, a data access population service 304 may also be used. The data access population service 304 is implemented in a machine accessible medium and is also processed by a machine. The data access population service 304 is used to populate the entries of the data access table 301 with user identifiers, optionally the table identifiers, and the key values in response to row level security defined for users and tables of the database to support a more fine grain and a row level of security against tables of the database.

According to an embodiment, the row level security service 302 is to dynamically acquire columns (fields) that define row qualifier types for user tables and that dynamically combines the row qualifier types together in selective combinations to regenerate or construct specific key values. These reconstructed key values can be used to compare with the key values of the data access table 301 to ensure proper security at the row level for the tables.

In some cases, the row level security service 302 identifies the each unique row qualifier type as a unique prime number. Each set or combination of prime numbers are multiplied together in order to generate the key values as a product of the primes. Another approach may be used as well, where the log of the primes are multiplied together to acquire the key value. This latter approach may be used when the product has the potential of being too large to be supported by the database. Examples of these key generation processing techniques and of the processing associated with the row level security service 302 were presented above with reference to the methods 100 and 200 of the FIGS. 1 and 2.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    detecting an access attempt against a table of a database made by a user, the table includes row level security;
    acquiring a key that is associated with the user for the table, the key is a signature not specifically tied to any user including the user and the key is usable by other users the key is a hash value for identifying a particular combination of rows in the table for which access is being granted;
    acquiring qualifiers for a number of rows of the table via a column associated with the table having the qualifiers;
    reproducing the key using a selective combination of unique qualifier types; and
    identifying the selective rows from the selective combination of the unique qualifier types used to reproduce the key; and
    restricting the user's access to selective rows of the table in response to the key, the particular combination of rows identifies the selective rows, and the key provides the user and the other users having the key with access to the specific rows within the table.

2. The method of claim 1, wherein reproducing further includes acquiring the selective combination of the unique qualifier types from a key table indexed via the key, wherein an entry into the key table includes each of the unique qualifier types that comprise the selective combination.

3. The method of claim 1, wherein acquiring further includes searching a data access table using an identifier associated with the user and using a table identifier associated with the table, which the user is attempting to access, in order to acquire the key.

4. The method of claim 1, wherein restricting further includes removing rows, which are not part of the selective rows, from each view of the table presented to the user.

5. The method of claim 1, wherein detecting further includes authenticating the user for access to the database before detecting the access attempt.

6. The method of claim 1, wherein detecting further includes identifying the row level security as a security attribute of the table.

7. A system comprising:
    a data access table residing in a database and accessible from a non-transitory machine-readable medium, the data access table includes a plurality of entries, and each entry having a user identifier and a key value;
    row level security service accessible in the machine-readable medium and to be processed by a machine, the row level security service is to access the data access table to determine when a particular row of a particular user table is accessible and viewable by a particular user in response to a particular key value noted in the data access table for a particular user identifier, the key value is a hash value that defines specific combination of rows for a specific table of the database for which access is permissible when the particular user or other users are associated with the key value and the key value represented as a signature that is independent of any user including the particular user and can be used and associated with the other users; and
    a key table residing in the database and accessible from the non-transitory machine-readable medium, wherein the key table includes a plurality of entries and each entry includes a selective combination of qualifier types, wherein each qualifier type identifies a particular row of a particular table, wherein the row level security service is to use the key table to identify selective rows of the particular user table that are viewable and accessible by the particular user.

8. The system of claim 7 further comprising, a data access population service accessible from the machine-readable medium and to be processed by the machine, wherein the data access population service is to populate the entries of the data access table in response to row level security defined for users and tables of the database that support row level security.

9. The system of claim 7, wherein the row level security service is to dynamically acquire columns defining row qualifier types for user tables and combine selective qualifier types together to regenerate key values that can be compared to key values housed in the entries of the data access table.

10. The system of claim 9, wherein the row level security service is to identify each row qualifier type as a unique prime number.

11. The system of claim 10, wherein the row level security service is to multiply each unique prime number associated with the selective qualifier types together in order to regenerate the key values.

* * * * *

UNITED STATES PATENT AND TRADEMARK OFFICE
CERTIFICATE OF CORRECTION

PATENT NO. : 8,027,993 B2
APPLICATION NO. : 11/646654
DATED : September 27, 2011
INVENTOR(S) : David Holmes et al.

It is certified that error appears in the above-identified patent and that said Letters Patent is hereby corrected as shown below:

Title Page, item [73] Assignee: Reads Teradota US, Inc.
Assignee: Should read Teradata US, Inc.

Signed and Sealed this
Thirteenth Day of March, 2012

David J. Kappos
*Director of the United States Patent and Trademark Office*